US010295831B2

(12) United States Patent
Eppich

(10) Patent No.: US 10,295,831 B2
(45) Date of Patent: May 21, 2019

(54) LIGHT-CONDUCTING DEVICE, DEVICE HAVING A LIGHT-CONDUCTING DEVICE, AND MEANS FOR EMITTING LINEAR PARALLEL LIGHT BEAMS

(71) Applicant: FORSCHUNGSVERBUND BERLIN E.V., Berlin (DE)

(72) Inventor: Bernd Eppich, Berlin (DE)

(73) Assignee: FORSCHUNGSVERBUND BERLIN E.V., Berlin (DE)

(*) Notice: Subject to any disclaimer, the term of this patent is extended or adjusted under 35 U.S.C. 154(b) by 350 days.

(21) Appl. No.: 15/120,379

(22) PCT Filed: Feb. 24, 2015

(86) PCT No.: PCT/EP2015/053791
§ 371 (c)(1),
(2) Date: Aug. 19, 2016

(87) PCT Pub. No.: WO2015/128311
PCT Pub. Date: Sep. 3, 2015

(65) Prior Publication Data
US 2017/0059874 A1    Mar. 2, 2017

(30) Foreign Application Priority Data

Feb. 26, 2014 (DE) .................. 10 2014 203 479

(51) Int. Cl.
*G02B 27/30* (2006.01)
*G02B 27/09* (2006.01)
(Continued)

(52) U.S. Cl.
CPC ......... *G02B 27/0972* (2013.01); *G02B 5/045* (2013.01); *G02B 17/002* (2013.01);
(Continued)

(58) Field of Classification Search
CPC ................................................. G02B 27/0972
(Continued)

(56) References Cited

U.S. PATENT DOCUMENTS

| 6,377,410 B1 | 4/2002 | Wang et al. |
| 2004/0252744 A1* | 12/2004 | Anikitchev ........ G02B 27/0977 372/100 |
| 2005/0068633 A1* | 3/2005 | Grenier .............. G02B 27/0977 359/627 |

FOREIGN PATENT DOCUMENTS

| DE | 102004015835 | 10/2005 |
| DE | 102006018504 | 10/2007 |

(Continued)

OTHER PUBLICATIONS

International Search Report of PCT/EP2015/053791, dated May 26, 2015.

*Primary Examiner* — James C. Jones
(74) *Attorney, Agent, or Firm* — Workman Nydegger

(57) ABSTRACT

The disclosure relates to a light-conducting device.
The light-conducting device includes k>1 first deflection devices that are parallel to one another and arranged along a first direction (X), and k second deflection devices that are parallel to one another and arranged along a second direction (Y) perpendicular to the first direction. A third direction (Z) is perpendicular to the first and second direction (X, Y). Each of the second deflection devices is arranged in a same fourth direction (P) with respect to one of the first deflection devices. The first deflection devices comprise optical axes directed in a fifth direction, and the second deflection devices comprise optical axes directed opposite to the fifth direction. The fifth direction is an angle bisector of an angle between the third and the fourth direction.

7 Claims, 6 Drawing Sheets

(51) Int. Cl.
*G02B 19/00* (2006.01)
*G02B 17/00* (2006.01)
*G02B 17/04* (2006.01)
*G02B 5/04* (2006.01)

(52) U.S. Cl.
CPC ....... *G02B 17/045* (2013.01); *G02B 19/0057* (2013.01); *G02B 27/0922* (2013.01); *G02B 27/0977* (2013.01); *G02B 27/30* (2013.01)

(58) Field of Classification Search
USPC ........................................................ 359/641
See application file for complete search history.

(56) References Cited

FOREIGN PATENT DOCUMENTS

| | | |
|---|---|---|
| DE | 102008033358 | 2/2009 |
| DE | 102009031046 | 1/2011 |
| EP | 1752812 | 2/2007 |
| WO | WO 2004/025704 | 3/2004 |
| WO | WO 2014/026713 | 2/2014 |

* cited by examiner

LIGHT-CONDUCTING DEVICE, DEVICE HAVING A LIGHT-CONDUCTING DEVICE, AND MEANS FOR EMITTING LINEAR PARALLEL LIGHT BEAMS

CROSS REFERENCE TO RELATED APPLICATIONS

This application is a U.S. Nationalization of PCT Application Number PCt/EP2015/053791, filed on Feb. 24, 2015, which claims priority to German Patent Application No. 102014203479.5, filed on Feb. 26, 2014, the entireties of which are incorporated herein by reference.

FIELD OF THE INVENTION

The invention relates to a light-conducting device and a device which comprises a light-conducting device and means for emitting at least k linearly arranged light beams.

BACKGROUND

Light-conducting devices have a broad range of applications in optics, for example in laser optics. An exemplary application is the deflection of linearly arranged light beams.

Generally, optical deflection devices cause light beams which are incident onto the deflection device at an incident angle different from 0° and 90° with respect to an optical axis of the deflection device to be deflected in a plane defined by the optical axis and the incident direction, for example in such a way that the direction of the deflected light beam also includes the incident angle with the optical axis, so that the incident beam and the emergent beam include twice the incident angle. Many optical elements are suitable to deflect light beams. Mirrors and prisms are examples for an optical deflection device.

Prisms are transparent bodies having two parallel base sides in the shape of triangles, trapezoids or parallelograms and at least three rectangular sides perpendicularly adjacent to each of the two base sides. At least one of the rectangular sides is not perpendicularly adjacent to the other sides.

Transparent cuboids with a refractive index greater than 1 can also serve for the beam deflection.

A typical application field of light-conducting devices is the beam shaping in order to improve the beam quality of a light beam generated by a laser bar. In order to make available diode lasers with higher performance, several laser emitters are arranged in a first direction (slow axis) parallel to the active layer and combined into a laser component which is referred to as a laser bar. The beam generated by the bar has a significantly poorer beam quality in the first direction than in a second direction (fast axis) perpendicular to the active layer. The reason therefore is that the beam diameter is larger by orders of magnitude in the first direction than in the second direction. In fact, the beam quality is the inverse beam quality factor $M^2$. The beam quality factor $M^2$ indicates the divergence angle of a real laser beam compared to the divergence angle of an ideal Gaussian beam with an identical (waist) diameter. The divergence angle of the resulting laser beam is smaller in the first direction than in the second direction. By changing the beam diameter in the first and the second direction while maintaining the divergences, the beam can be shaped such that the beam qualities are equalized. The direction of emission is usually perpendicular to the first and second direction.

Thus, the German published patent application DE 10 2009 031 046 A1 proposes a laser optics for beam shaping laser light emitted in a plane by means of semiconductor or diode lasers which comprises a plate fan. Several plates of the plate fan are arranged offset in the direction perpendicular to their surface sides, wherein the plates comprise a planar narrow plate side for the beam entry and an opposite further planar narrow plate side for the beam exit, respectively.

U.S. Pat. No. 6,377,410 B1, US 2005/0068633 A1, WO 2014/026713 A1 and DE 10 2008 033 358 A1 also relate to beam shaping.

SUMMARY OF THE INVENTION

In order to improve the beam shaping, a light-conducting device according to claim 1 is proposed by means of which the beam diameter can be decreased in a first direction and can be increased in a second direction perpendicular thereto. The light-conducting device comprises k>1 first deflection devices that are parallel to one another and arranged along the first direction, and k second deflection devices that are parallel to one another and arranged along the second direction perpendicular to the first direction, wherein a third direction is perpendicular to the first and second direction. The first deflection devices comprise optical axes directed in a fifth direction, and the second deflection devices comprise optical axes directed opposite to the fifth direction. In this case, each of the second deflection devices is arranged in a same fourth direction with respect to one of the first deflection devices, wherein the fifth direction is an angle bisector of an angle between the third direction and the fourth direction.

The light-conducting device permits to deflect each of k light beams which are linearly arranged behind one another in the first direction and are emitted onto the first deflection devices in the third direction onto the fifth direction and therefore in such a way that the deflected light beams are incident onto the second deflection devices and are deflected once again in the third direction by those. As a result, the light beams that are deflected once again are arranged in the second direction. This permits to decrease the beam diameter (of the total beam composed of the partial beams) in the first direction and to increase it in the second direction.

In an exemplary embodiment, the first and second deflection devices are mirrors or surfaces of prisms.

Thus, k rhombic prisms can be comprised by the light-conducting device, wherein two surfaces of each of the prisms that are parallel to one another can form one of the first and the respective associated second deflection device.

The prisms can comprise a same base distance, wherein the bases of adjacent prisms are arranged adjacent one another.

In order to improve the beam shaping, a device according to claim 5 is further proposed. The device comprises the inventively proposed light-conducting device and means for emitting at least k parallel light beams in the third direction. In this case, the light beams can be emitted such that they are arranged along the first direction. The means is oriented such that each of the light beams can be emitted onto respectively one of the first deflection devices in such a way that this device deflects the respective light beam onto the associated second deflection device. The associated second deflection device deflects the respective light beam once again in the third direction. As a result, the light beams that are deflected once again are arranged along the second direction.

In an embodiment of the device, the means is adapted to emit k+1 parallel light beams in a first plane, wherein an outer light beam does not undergo a deflection and can be emitted along an intersection line of the first plane and a second plane. In this case, the light beams deflected by the light-conducting device propagate parallel to the intersection line in the second plane.

Further, it is possible that the means comprises a laser bar for emitting the light beams. In this case, the device further comprises at least one FAC element for collimating the laser beams in the second direction, k SAC elements for collimating the laser beams in the first direction, and at least one lens for coupling at least the twice-deflected laser beams into an optical fiber.

DESCRIPTION OF THE FIGURES

Hereinafter, exemplary embodiments of the present invention are explained in more detail with the aid of the following figures.

In the figures:

FIG. 1 shows an exemplary embodiment of the light-conducting device 60 according to the invention. Herein, the light-conducting device 60 is exemplarily formed by a transparent body. In the example, the body 60 comprises two partial bodies 61, 62 which are formed as rhombic deflection prisms, i.e., blocks with bases formed as parallelograms. Edges of one of the bases include a non-perpendicular angle Bases of adjacent prisms are adjacent one another. Edges of the bases of a respective prism are connected by two pairs of lateral surfaces perpendicular to the bases and parallel to one another, respectively. The partial bodies have a same base distance.

Thus, in the exemplary embodiment, one of the pairs of parallel lateral surfaces comprises equal lateral surfaces for all partial bodies, hereinafter referred to as deflection surfaces U11, U12, U21, U22 because light beams in the body can be deflected by those. Hereinafter, the lateral surfaces adjacent the deflection surfaces are referred to as transmission surfaces T11, T21 because a light beam can be transmitted into the partial body for deflection and after the deflection be transmitted out of the partial body by those. The partial bodies have a same base distance, a same transmission surface distance and different individual deflection surface distances.

Figure 1:
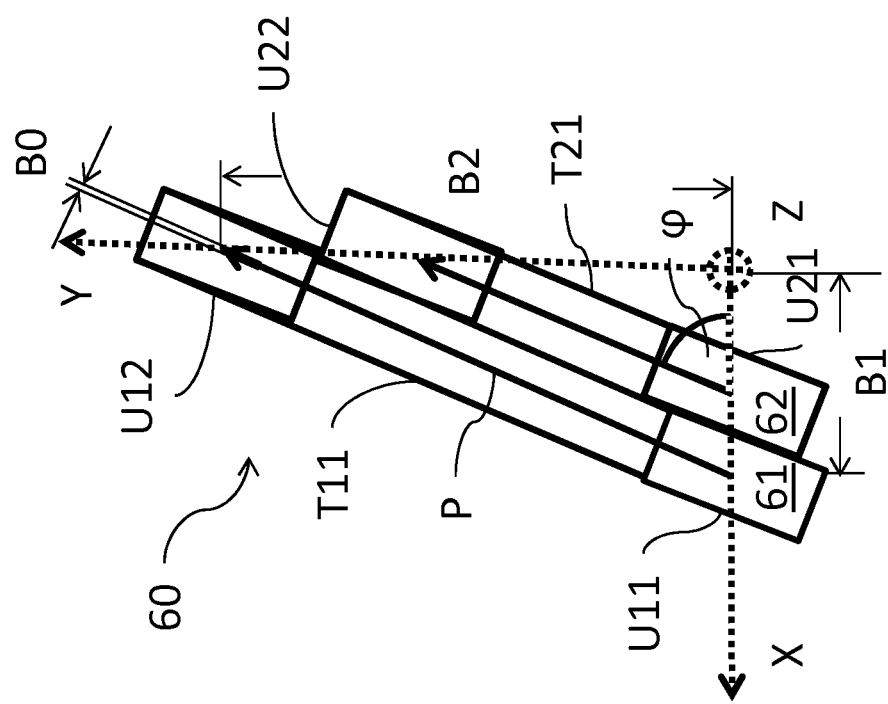
FIG. 1 shows an exemplary embodiment of the light-conducting device according to the invention.

The partial bodies 61, 62 are arranged relative to one another in such a way that respective first deflection surfaces U11, U21 of the pair of deflection surfaces of each partial body 61, 62 are arranged behind one another with respect to a first direction X (x-direction in FIG. 1) and arranged side by side with respect to a second direction Y (y-direction in FIG. 1), wherein the second direction Y is perpendicular to the first direction X. The respective second deflection surfaces U12, U22 of the pair are arranged behind one another with respect to the second direction Y and arranged side by side with respect to the first direction. In this case, the surface normals of the first deflection surfaces U11, U21 are parallel to one another. Likewise, the surface normals of the second deflection surfaces U12, U22 are parallel to one another, but are antiparallel to the surface normals of the first deflection surfaces U11, U21. The surface normals of the deflection surfaces, i.e., the optical axes of the deflection surfaces, include an angle of 45° or 135° with a third direction Z (z-direction in FIG. 1) perpendicular to the first and the second direction, wherein 360° equals the full circle. Projections of the surface normals of the first deflection surfaces U11, U21 onto the plane that is spanned by the first direction X and the second direction Y in this case point in a fourth direction P. Intersection lines of the plane with respective further planes that is spanned by the surface normal of the plane and the respective surface normal of the respective first deflection surface extend in the fourth direction. The respective second deflection surface U12, U22 of each of the prisms is located in the fourth direction P, when viewed from the first deflection surface U11, U21 of the respective prism, that includes an angle φ different from 0° and from 90° with the first direction X. In exemplary embodiments, angles between 40° and 50° are realized. Other exemplary embodiments comprise angles between 43° and 47°.

Light beams which are arranged behind one another in the first direction X and arranged side by side with respect to the second direction Y and are emitted in the third direction Z enter the partial bodies through the transmission surfaces T11, T21 and are incident onto the first deflection surfaces U11, U21. There, they undergo a first deflection. The once-deflected light beams propagate in the partial bodies in the fourth direction P. Therefore, they are incident onto the second deflection surfaces U12, U22. There, they undergo a second deflection. The twice-deflected light beams propagate once again in the third direction Z and exit the partial body through the transmission surfaces opposite to the transmission surfaces T11, T21. The twice-deflected light beams are arranged side by side with respect to the first direction X and arranged behind one another with respect to the second direction Y.

In this case, each individual beam maintains the beam widths and the divergence in the first direction X and the second direction Y when being deflected by the light-conducting device. Typically, after the collimation by FAC and SAC, each individual beam is elliptical with a width B0 in the second direction Y and a width B0 in the first direction X. Nevertheless, the total beam formed by the individual beams changes its beam width, the entering beam has a width B1 with respect to the first direction X and the width B0 with respect to the second direction Y which is equal to the width of an individual beam in the second direction. In this case, B1 is superior to B0. After exiting the deflection device 60, the deflected total beam has, in the first direction X, the width B0 of an individual beam in the first direction X and a larger width B2 with respect to the second direction Y. The ratio of B2 to B1 is defined by the angle φ: B2=B1*tan φ.

In order to determine the beam quality of the deflected total beam in the first direction X and the second direction Y, therefore, other reference divergence angles of ideal Gaussian beams are used than when determining the beam quality of the not yet deflected total beam, due to the change of the beam width. Thus, the beam qualities in the first direction X and the second direction Y can be equalized to one another.

Figure 2:
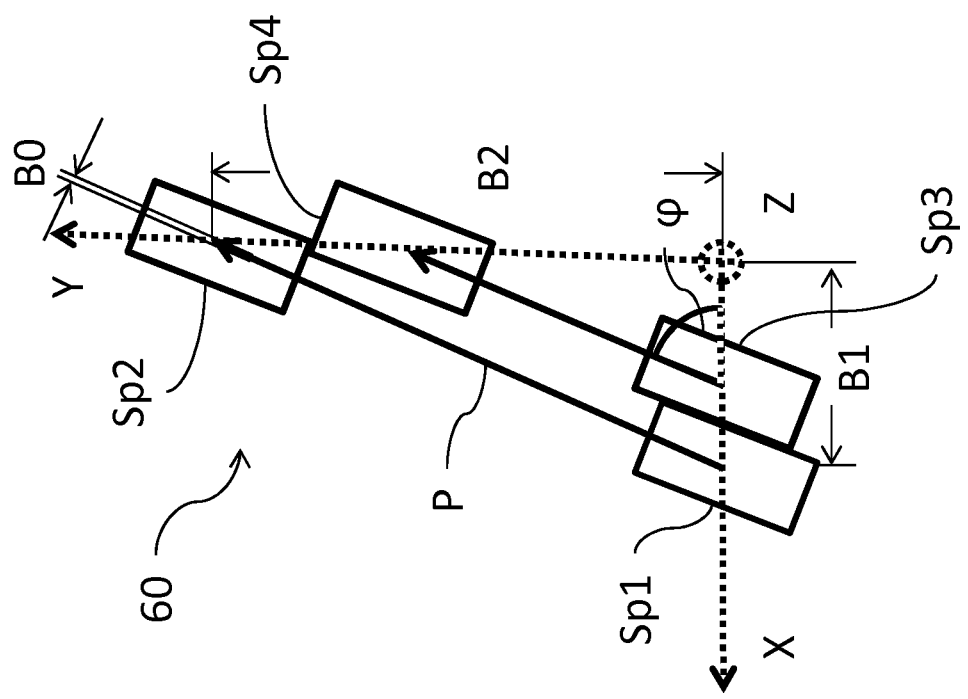
FIG. 2 shows another exemplary embodiment of the light-conducting device according to the invention.

In the further exemplary embodiment illustrated in FIG. 2, the light-conducting device 60 is implemented by mirrors Sp1, Sp2, Sp3 and Sp4. In this case, the mirrors Sp1 and Sp3 function as the first deflection surfaces and the mirrors Sp2 and Sp4 function as the second deflection surfaces.

Figure 3:
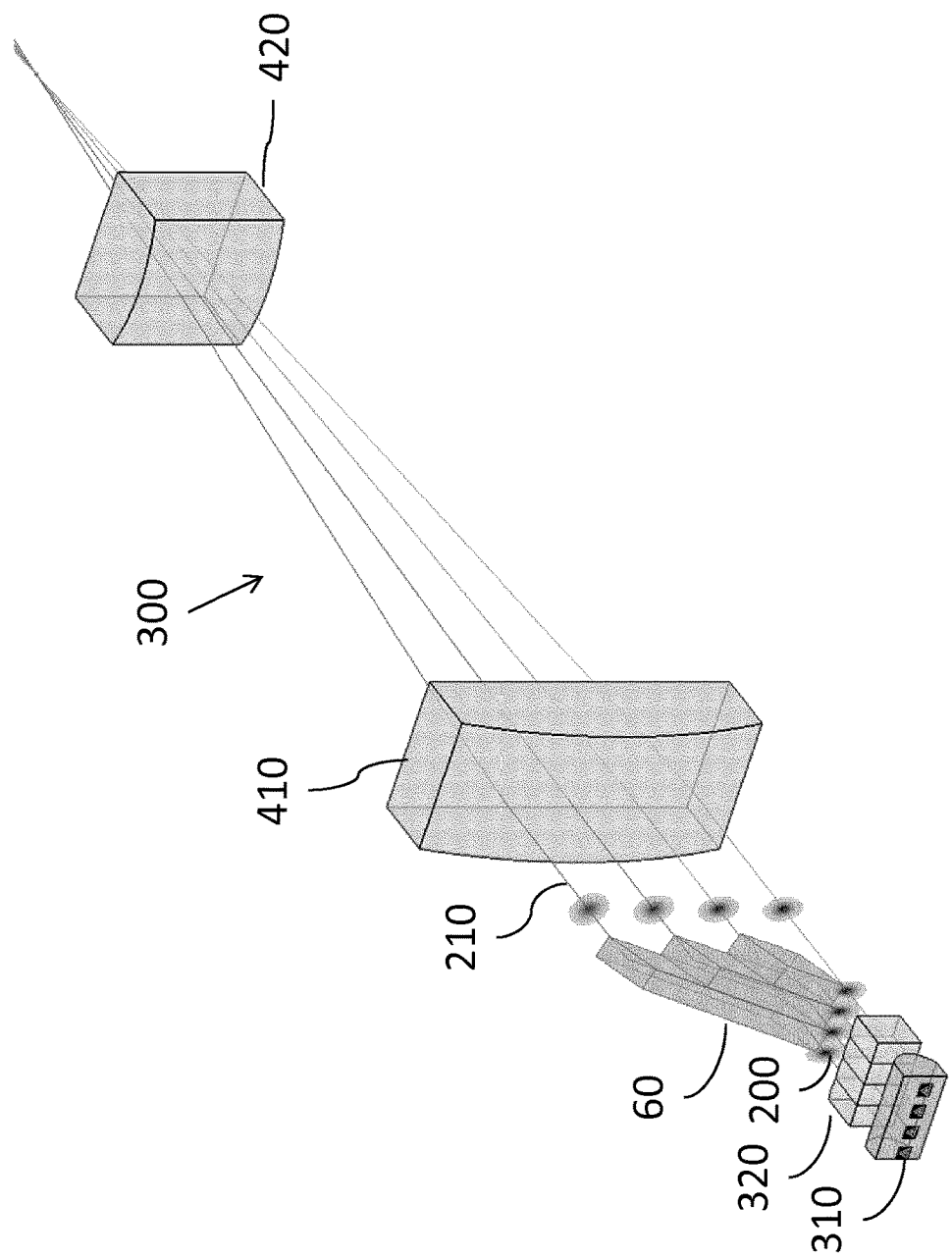
FIG. 3 shows an exemplary embodiment of the device according to the invention.
Figure 4:
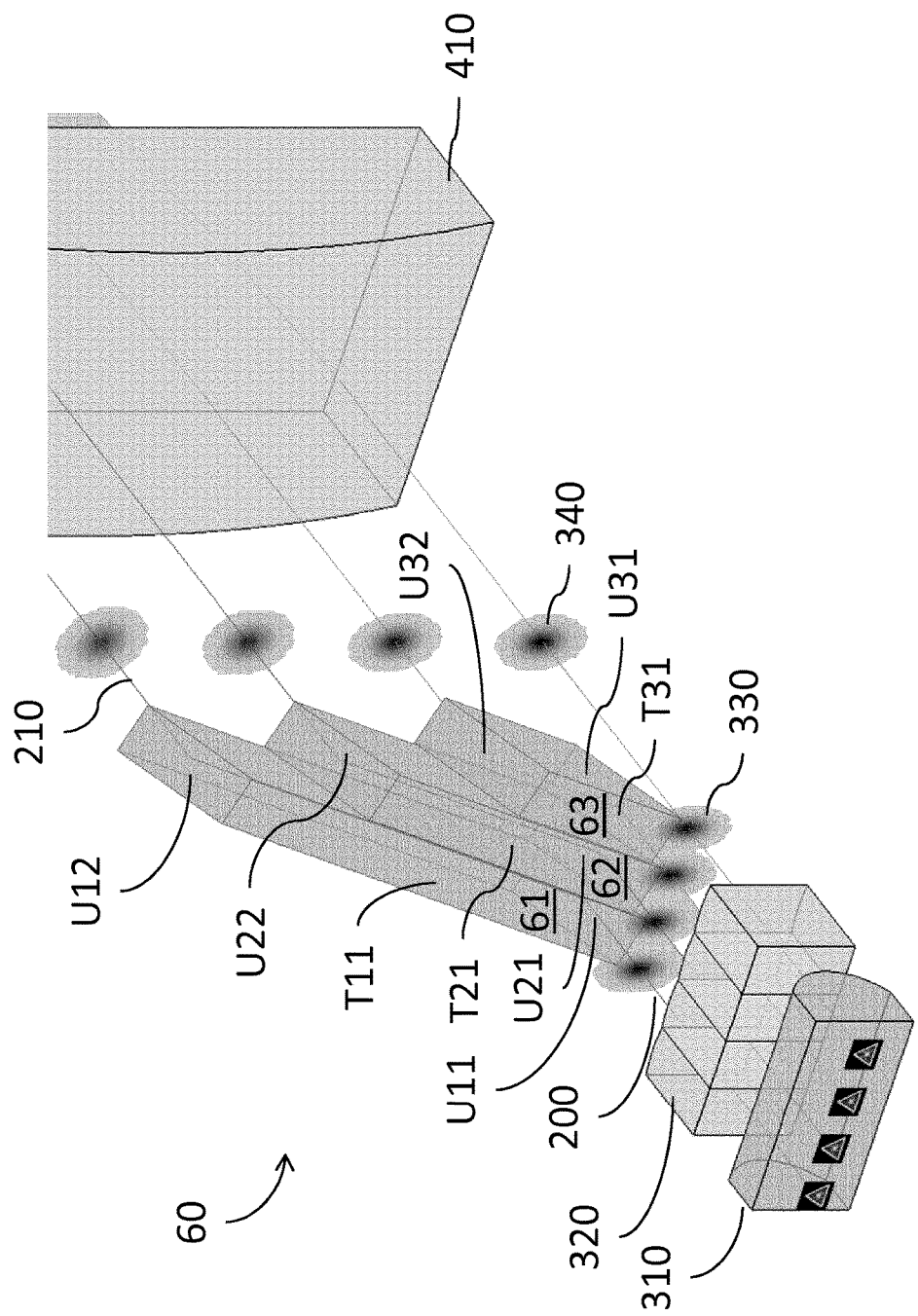
FIG. 4 shows a detail of the embodiment shown in FIG. 3.
Figure 5:
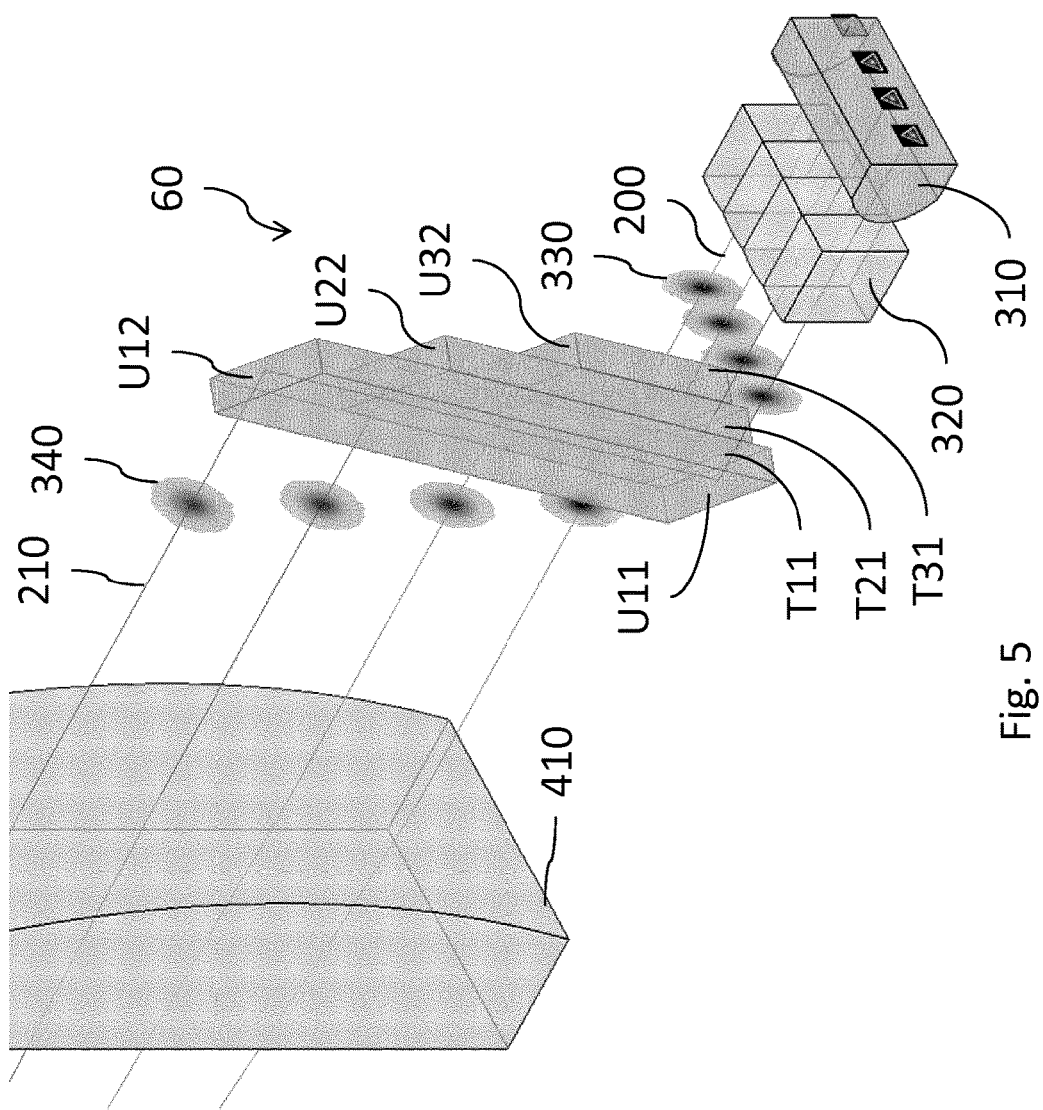
FIG. 5 shows another view of the detail of the embodiment of FIG. 3 that is shown in FIG. 4.

FIG. 3 shows an exemplary embodiment of the device 300 according to the invention having an exemplary embodiment of the light-conducting device 6 according to the invention and means for emitting linearly arranged parallel light beams. FIGS. 4 and 5 show details of the embodiment shown in FIG. 3. The light-conducting device according to the invention is especially useful in the use of laser bars for fiber optics. Laser bars are several semiconductor diodes or laser diodes or laser semiconductors that are assembled in a row to form a laser component in order to be able to generate higher performances than by the individual laser sources. Due to the characteristic of the laser sources and their arrangement, the resulting beam has a slightly lower divergence in a plane, but it has a much larger width than perpendicular to the plane. The divergence decreases by a factor of 2 to 3 whereas the beam width is larger by one or more orders of magnitude. This leads to significantly different beam qualities in the plane and perpendicular thereto. However, for the fiber optics and other applications it is desirable to equalize the beam qualities to one another in both directions.

The device 300 comprises a laser bar for emitting parallel laser beams arranged at a constant distance to one another in a plane. In the illustrated example, 4 laser beams are emitted behind one another with respect to an arrangement direction (first direction X, referred to as the slow axis). The emitted laser beams are collimated vertically (second direction Y, referred to as the fast axis), i.e., perpendicularly to the first direction X. A further comprised array 320 of SAC elements collimates each vertically collimated laser beam horizontally, i.e., perpendicularly to the emission direction and parallel to the arrangement direction of the laser beams.

In the example, the deflection surfaces U11, U12, U21, U22, U31, U32 include an angle of 45° with the transmission surfaces T11, T21, T31. The FAC lens 310 and the SAC array 320 are arranged in relation to the first of the deflection surfaces such that the emission direction Z of the laser beams 200 is parallel to the surface normal of the transmission surfaces T11, T21, T31.

Then, three of the laser beams 200 perpendicularly enter the body 60 through one of the transmission surfaces T11, T21, T31, are totally reflected by the first deflection surfaces U11, U21, U31 and deflected such that they extend parallel to the transmission surfaces T11, T21, T31 and to the bases in the body. Afterwards, they are totally reflected once again by the second deflection surfaces U12, U22, U33 and deflected such that they run once again parallel to the emission direction Z and exit perpendicularly through the other one of the transmission surfaces. As a result, the laser beams 210 twice-deflected in the exemplary embodiment run in another plane that is rotated by 90° about the emission direction Z relative to the plane. In the illustrated example, one of the laser beams is emitted along an intersection line of the one plane and the other plane and is not deflected. The deflected laser beams are not rotated by the light-conducting device, so that the divergence of the individual beams, and therefore also of the total beam, remains unchanged in the first direction X and in the second direction Y, whereas the width of the total beam in the first direction X and in the second direction Y is changed.

The resulting total beam now presents a beam quality equalized to each other perpendicularly and parallel to the plane and is coupled into an optical fiber by two lenses 410, 420 in the exemplary embodiment.

Figure 6:
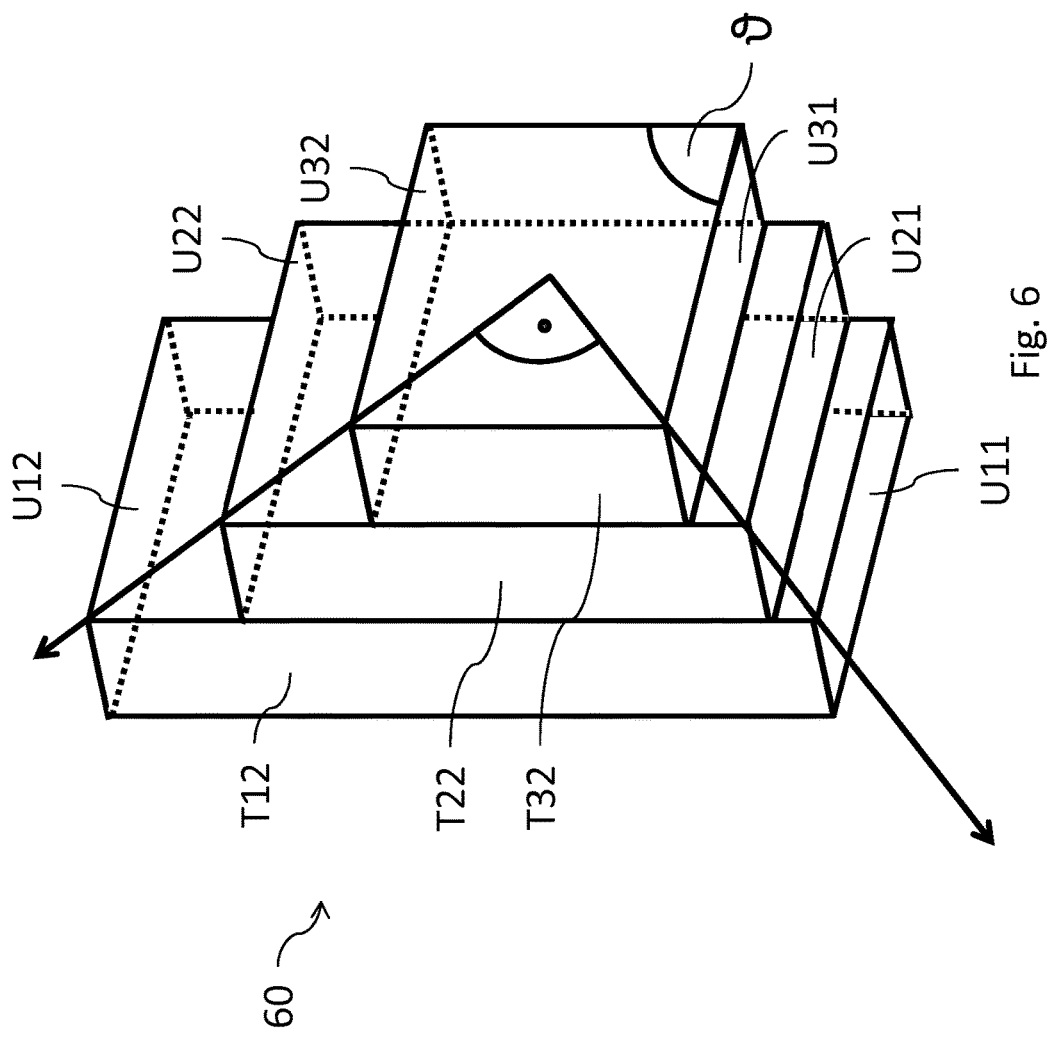
FIG. 6 shows yet another exemplary embodiment of the light-conducting device according to the invention.

FIG. 6 shows yet another exemplary embodiment of the light-conducting device 60 according to the invention. Once again, rhombic prisms whose second transmission surfaces T12, T22, T32 include an angle with the deflection surfaces U11, U12, U21, U22, U31, U32, respectively, form the light-conducting device 60. As can be seen, first corners of the rhombic prisms are located on a first straight line. Second corners which are adjacent to the first corners, i.e., are connected by an edge of the respective prism, are located on a second straight line that is perpendicular thereto. In this case, the second transmission surfaces T12, T22, T32 are located in one plane.

The invention claimed is:

1. A light-conducting device, comprising k>1 first deflection devices that are parallel to one another and formed such that light beams which are incident onto the deflection device at an incident angle different from 0° and 90° with respect to an optical axis of the deflection device are deflected in a plane defined by the optical axis and the incident direction in such a way that the direction of the deflected light beam also includes the incident angle with the optical axis, so that the incident beam and the emergent beam include twice the incident angle, and wherein the first deflection devices are arranged along a first direction (X) with the optical axes of the first deflection devices being oriented parallel to one another, and k second deflection devices that are parallel to one another and arranged along a second direction (Y), wherein a third direction (Z) is perpendicular to the first and second direction (X, Y), and wherein each of the second deflection devices are arranged in a same fourth direction (P) with respect to one of the first deflection devices, wherein the first deflection devices comprise optical axes directed in a fifth direction, characterized in that the second direction is perpendicular to the first direction and the second deflection devices comprise optical axes directed opposite to the fifth direction, wherein the fifth direction is an angle bisector of an angle between the third and the fourth direction.

2. The light-conducting device according to claim 1, wherein the first and second deflection devices are mirrors or surfaces of prisms.

3. The light-conducting device according to claim 2, wherein the light-conducting device comprises k rhombic prisms, wherein two surfaces of each of the prisms that are parallel to one another form one of the first and the respective associated second deflection device.

4. The light-conducting device according to claim 3, wherein the prisms comprise a same distance between bases, and wherein the bases of adjacent prisms are arranged adjacent one another.

5. A device, comprising:
a light-conducting device, comprising k>1 first deflection devices that are parallel to one another and formed such that light beams which are incident onto the deflection device at an incident angle different from 0° and 90° with respect to an optical axis of the deflection device are deflected in a plane defined by the optical axis and the incident direction in such a way that the direction of the deflected light beam also includes the incident angle with the optical axis, so that the incident beam and the emergent beam include twice the incident angle, and wherein the first deflection devices are arranged along a first direction (X) with the optical axes of the first deflection devices being oriented parallel to one another, and k second deflection devices that are parallel to one another and arranged along a second direction (Y), wherein a third direction (Z) is perpendicular to the first and second direction (X, Y), and wherein each of the second deflection devices are arranged in a same fourth direction (P) with respect to one of the first deflection devices, wherein the first deflection devices comprise optical axes directed in a fifth direction, characterized in that the second direction is perpendicular to the first direction and the second deflection devices comprise optical axes directed opposite to the fifth direction, wherein the fifth direction is an angle bisector of an angle between the third and the fourth direction; and a laser bar for emitting the light beams, at least one fast axis collimator element for collimating the laser beams in the second direction, k slow axis collimator elements for collimating the laser beams in the first direction, and at least one lens for coupling the laser beams deflected by the light-conducting device into an optical fiber, wherein the laser bar, the fast axis collimator element and the slow axis collimator elements emit at least k parallel light beams in the third direction (Z), wherein the laser bar, the fast axis collimator element and the slow axis collimator elements are oriented such that each of the light beams can be emitted onto one of the first deflection devices, respectively.

6. A device according to claim 5, wherein the laser bar, the fast axis collimator element and the slow axis collimator elements are adapted to emit k+1 parallel light beams in a first plane, and wherein an outer light beam does not undergo a deflection and can be emitted along an intersection line of the first plane and a second plane, wherein the light beams deflected by the light-conducting device propagate parallel to the intersection line in the second plane.

7. A light-conducting device, comprising k>1 first deflection prisms that are parallel to one another and formed such that light beams which are incident onto the deflection prisms at an incident angle different from 0° and 90° with respect to an optical axis of the deflection prisms are deflected in a plane defined by the optical axis and the incident direction in such a way that the direction of the deflected light beam also includes the incident angle with the optical axis, so that the incident beam and the emergent beam include twice the incident angle, and wherein the first deflection prisms are arranged along a first direction (X) with the optical axes of the first deflection prisms being oriented parallel to one another, and k second deflection prisms that are parallel to one another and arranged along a second direction (Y), wherein a third direction (Z) is perpendicular to the first and second direction (X, Y), and wherein each of the second deflection prisms are arranged in a same fourth direction (P) with respect to one of the first deflection prisms, wherein the first deflection prisms comprise optical axes directed in a fifth direction, characterized in that the second direction is perpendicular to the first direction and the second deflection devices comprise optical axes directed opposite to the fifth direction, wherein the fifth direction is an angle bisector of an angle between the third and the fourth direction, wherein the prisms comprise a same distance between bases, and wherein the bases of adjacent prisms are arranged adjacent one another.

* * * * *